United States Patent [19]

May

[11] Patent Number: 5,735,234

[45] Date of Patent: Apr. 7, 1998

[54] EXTENSIBLE TETHER APPARATUS AND METHOD

[76] Inventor: River May, 1301 Nutmeg La., Davis, Calif. 95616

[21] Appl. No.: 855,262

[22] Filed: May 13, 1997

Related U.S. Application Data

[60] Provisional application No. 60/024,230 Aug. 9, 1996.

[51] Int. Cl.⁶ .................................................. A01K 27/00
[52] U.S. Cl. ................................................................ 119/795
[58] Field of Search ................................ 119/770, 792, 119/793, 795; 441/75; 414/381

[56] References Cited

U.S. PATENT DOCUMENTS

| | | | |
|---|---|---|---|
| 147,920 | 2/1874 | Fallin | 119/795 X |
| 153,724 | 8/1874 | Schmidt | 119/795 X |
| 2,827,017 | 3/1958 | Ryan | 119/795 |
| 3,603,295 | 9/1971 | Shuman | 119/795 |
| 5,099,799 | 3/1992 | Giacobbe | 119/793 |

OTHER PUBLICATIONS

How To Rock Climb! Second Edition, by John Long Chockstone Press, Inc., Evergreen Colorado 1993; p. 155.

*Primary Examiner*—Robert P. Swiatek
*Attorney, Agent, or Firm*—Hall & Kerr

[57] ABSTRACT

An extensible tether apparatus comprising a flexible cord attached to a ring at a first, fixed end, a first loop formed by passing a second, free end of the cord through the ring, a second loop formed by passing the free end of the cord through the ring, and a third loop formed by passing the free end of the cord through a channel defined by the first and second loops. The length of cord adjacent the free end and the size of the third loop are adjusted by slidably extending or retracting the cord through the channel formed by the first and second loops. When tension is applied to the cord at the free end and/or the third loop, the first and second loops frictionally engage the portion of the cord passing through the channel in the first and second loops and prevent the cord from slipping from the adjusted position.

20 Claims, 5 Drawing Sheets

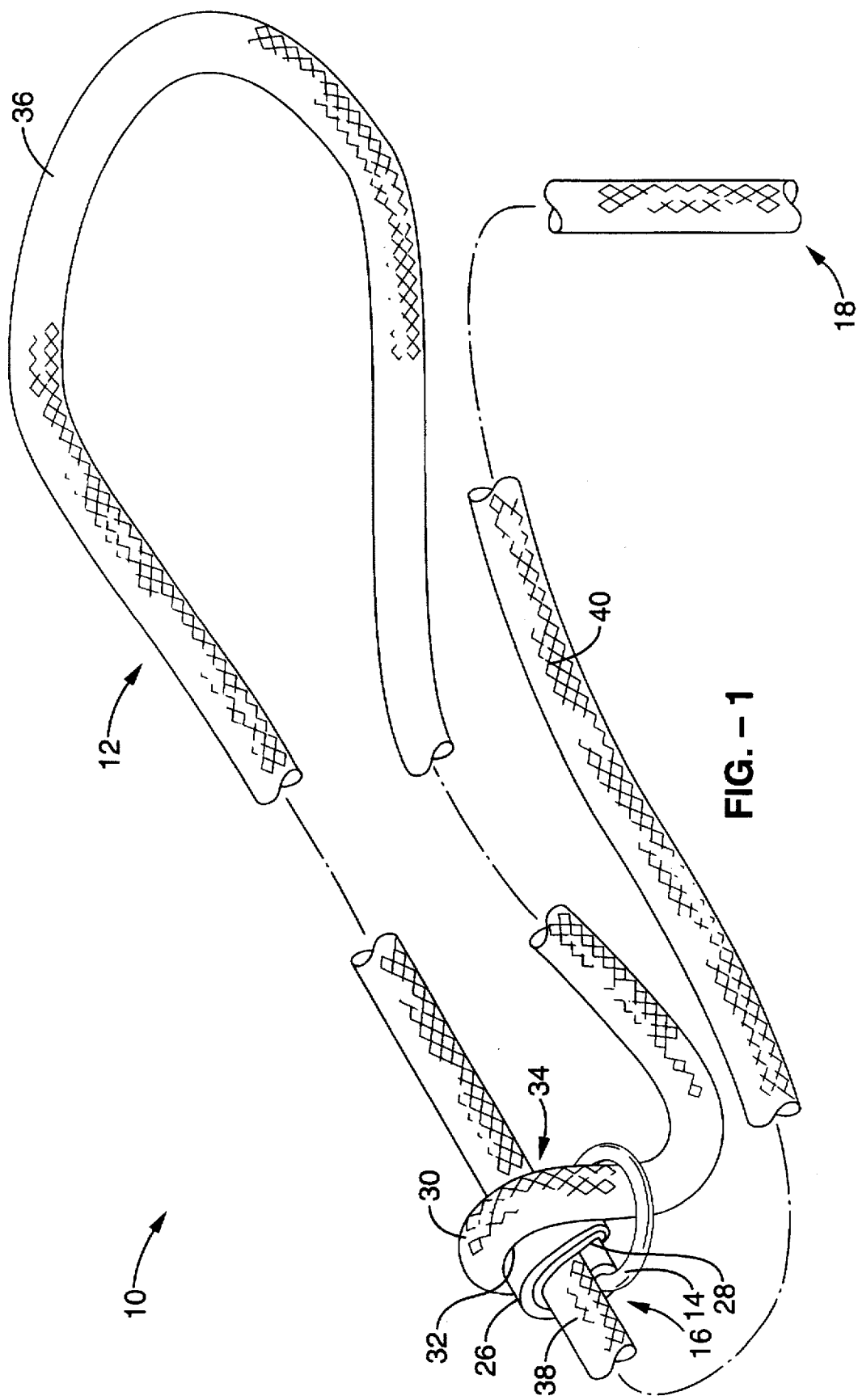

EXTENSIBLE TETHER APPARATUS AND METHOD

RELATED APPLICATION

This application claims the benefit of U.S. Provisional Application No. 60/024,230, filed Aug. 9, 1996.

BACKGROUND OF THE INVENTION

1. Field of the Invention

The invention pertains generally to devices and methods for adjusting the length of a rope or cord, and more particularly to an extensible tether apparatus and method which allows facile adjustment of the length of a cord, which is quick and easy to manufacture, and which retains the adjusted length of the cord without slippage.

2. Description of the Background Art

There exist numerous applications in which the use of ropes, cords, lines or tethers of adjustable length is desirable. The adjustment of rope length is commonly required, for example, during rope-assisted climbing, for adjusting the position of sails on wind-powered vessels, and for controlling the length of animal leashes. Various devices and methods have been developed to allow control of the length of ropes and tethers. The adjustment of rope length has traditionally been carried out by various types of knots wherein a rope is tied in a particular structure and configuration which allows slipping of a portion or portions of the rope relative to the knot to effect rope length adjustment. A common problem experienced with such knots which allow rope length adjustment is that the knots can undergo unwanted slipping after a length adjustment has been made, resulting in an incorrect rope length. Another problem with knots which allow rope length adjustment is that such knots tend to be complex and difficult to tie and generally require skill in knot tying to make and use. Many persons who need to adjust the length of a rope or tether may lack the required knot-tying skill. Further, once a knot has been tied by a person skilled in knot tying, to allow others to use the knot for rope length adjustment, the knot may subsequently become untied and rendered unusable.

Accordingly, there is a need for an extensible tether apparatus and method which is quick and simple to make, which does not undergo unwanted slipping from adjusted positions, and which can be prevented from being untied. The present invention satisfies these needs, as well as others, and generally overcomes the deficiencies found in the background art.

SUMMARY OF THE INVENTION

The present invention is an extensible tether apparatus which allows quick, easy and reversible adjustment of the length of a rope, cord, line or tether without unwanted slipping from the adjusted length. In general terms, the invention comprises a ring, a flexible cord or line having a first end fixed to the ring, a first loop in the cord adjacent the first or fixed end which passes through the ring, a second loop in the cord adjacent the first loop which also passes through the ring, and a third loop which is formed by passing the second or free end of the cord through the first and second loops. The first and second loops are tightened about the section of cord passing therethrough, and the third loop, which does not pass through the ring, can be adjusted in size by moving the cord through the first and second loops.

By way of example, and not of limitation, the first end of the cord is preferably of flattened structure and configuration, and is affixed to the ring by melt bonding or heat welding. A first overlap region is included wherein one portion of the first loop is folded over and frictionally engages another portion of the first loop. The first loop is formed by passing the free end of the cord through the ring. The second loop, which is also formed by passing the free end of the cord through the ring, partly covers or overlaps the first loop to provide a second overlap region wherein a portion of the second loop folds over and frictionally engages a portion of the first loop. The free end is then passed through both the first and second loops so that a generally straight or unfolded portion of the cord passes through the first and second loops to define the third loop, which is generally adjacent the second loop of the cord. The first and second loops are tightened over the straight section of cord and frictionally engage the section of cord passing through the first and second loops. Preferably, the cord is also fixed or welded to the ring by a second bonded region at a point between the first and second loops to prevent inadvertent untying of the first, second and third loops from the ring.

The length of the cord adjacent to the second or free end is adjusted or controlled by sliding the straight portion of the cord through the first and second loops. Changing the length of the cord adjacent the free end simultaneously results in changing of the size of the third loop. The third loop may be held by a person's hand, looped about a persons waist, or affixed to a post, rod or other object. A releasable clip may be attached to the second or free end of the cord for attachment to a dog collar or other object. When tension is applied to the cord from the third loop and/or free end of the cord, the straight portion of cord passing through the first and second loops is frictionally held place by the first and second loops and does not undergo slipping which would alter the adjusted length.

An object of the invention is to provide an extensible tether apparatus which allows facile adjustment of the length of a cord, line or rope.

Another object of the invention is to provide an extensible tether apparatus which does not undergo unwanted slipping during use which would alter the adjusted cord length.

Another object of the invention is to provide an extensible tether apparatus which is quick and easy to make and use without requiring extensive skill in knot tying.

Another object of the invention is to provide an extensible tether apparatus which cannot be rendered inoperable by untying.

Another object of the invention is to provide an extensible tether apparatus which has a loop of adjustable circumference for grasping by a user or attaching to objects.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is perspective view of an extensible tether apparatus in accordance with the present invention.

DESCRIPTION OF THE PREFERRED EMBODIMENTS

Figure 4B:
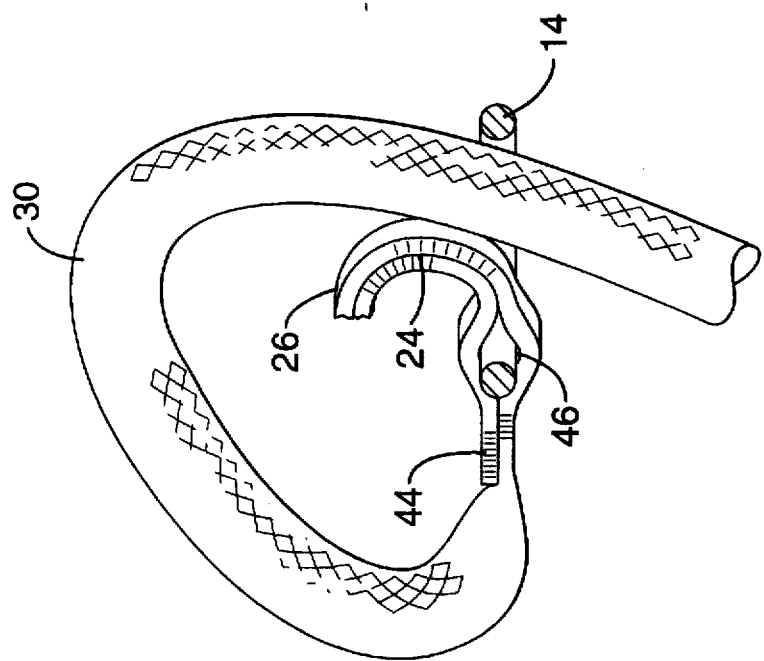
FIG. 4B is a side elevation view of the second bonded region, second loop, and portion of the first loop of the embodiment of FIG. 3, with the first bonded region omitted for clarity and with the ring shown in cross-section.
Figure 4A:
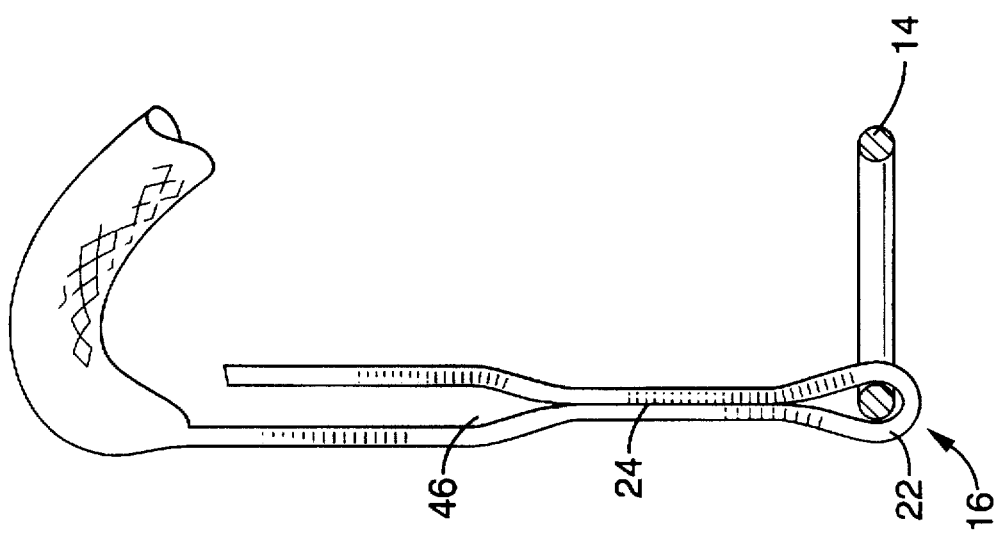
FIG. 4A is a side elevation view of the first end and first bonded region of the embodiment of FIG. 3 shown prior to formation of the second bonded region, with the ring shown in cross-section.
Figure 5:
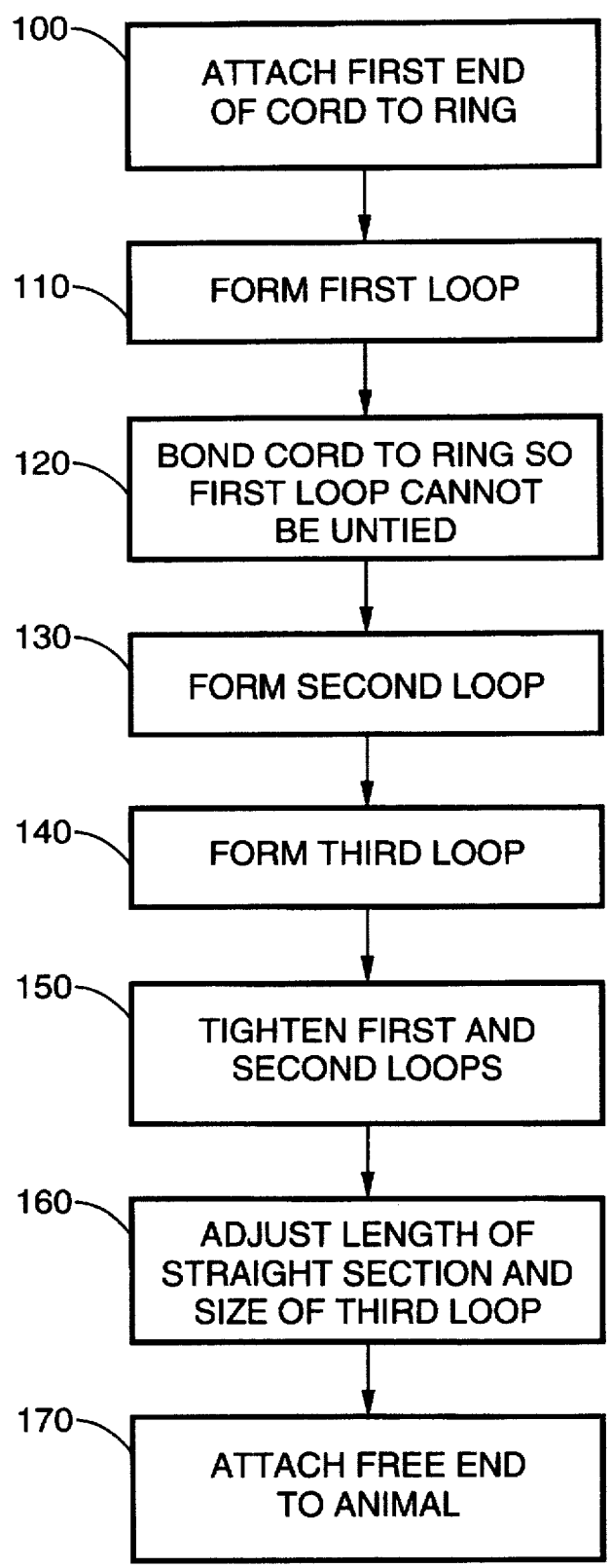
FIG. 5 is a flow diagram outlining the steps of making the extensible tether apparatus comprising the invention.

Referring more specifically to the drawings, for illustrative purposes the present invention is embodied in the apparatus generally shown in FIG. 1 through FIG. 4, and the method outlined in FIG. 5. It will be appreciated that the apparatus may vary as to configuration and as to details of the parts, and that the method may vary as to details and to the order of steps without departing from the basic concepts as disclosed herein. The invention is disclosed generally in terms of use as an extensible dog leash or animal tether. It will be readily apparent to those of ordinary skill in the art, however, that the invention may be employed in numerous applications which require the use of a rope, cord, line or tether of adjustable length.

Referring now to FIG. 1 and FIG. 2A through 2C, an extensible tether apparatus 10 in accordance with the present invention is generally shown. The apparatus 10 includes a flexible cord or rope 12 and a generally rigid ring or annulus 14. Ring 14 is preferably made of steel or other metal or a durable polymeric material. Cord 12 includes a first or fixed end 16 which is attached to ring 14, and a second or free end 18 which can be coupled to a dog collar (not shown) or other object.

Figure 2B:
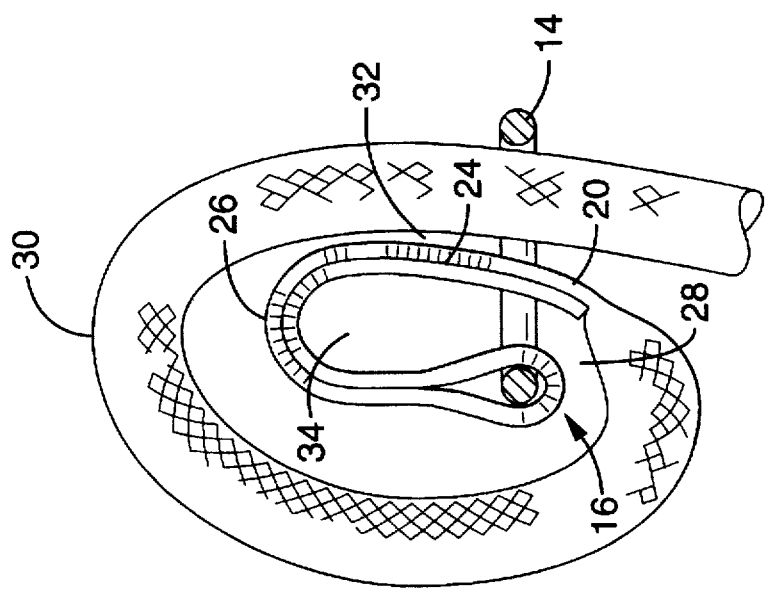
FIG. 2B is a side elevation view of the first and second loops of the apparatus shown loosened and with the ring shown in cross-section.
Figure 2A:
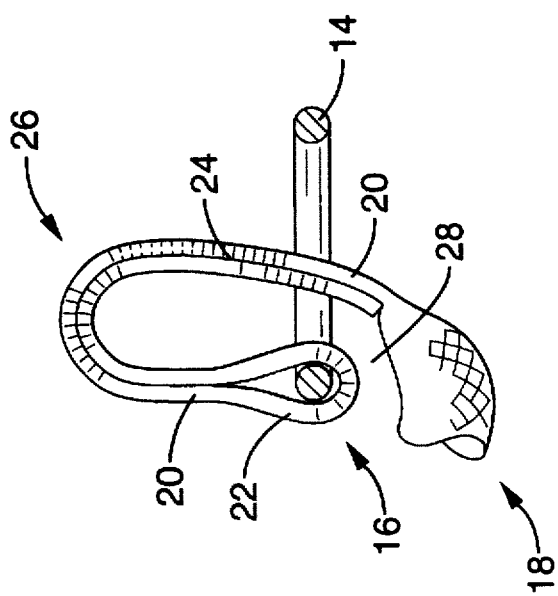
FIG. 2A is a side elevation view of the first loop of the extensible tether apparatus shown loosened and with the ring shown in partial cross-section.
Figure 2C:
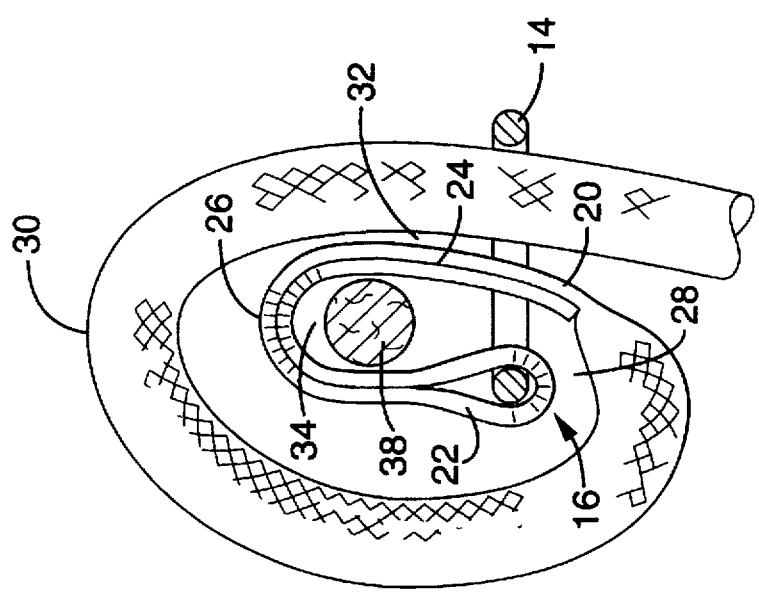
FIG. 2C is a side elevation view of the first and second loops and ring of FIG. 2B together with a portion of the cord, shown in cross-section, passing through the first and second loops.

Referring more particularly to FIG. 2A through FIG. 2C, as well as to FIG. 1, cord 12 is preferably of a type which includes a plurality of longitudinal internal reinforcing strands (not shown) sheathed within a flexible outer casing or sheath (not shown). Both the inner reinforcing strands and outer sheath are preferably made of woven fibers of nylon, polypropylene, polyester, or other natural or synthetic high strength polymeric fiber material. A portion of the inner strands are preferably removed from the outer sheath adjacent first end 16 of cord 12 to provide a relatively flattened section 20 of cord 12 adjacent first end 16, with flat section 20 comprising the flattened outer sheath portion from which the inner strands have been removed. Flat section 20 is utilized for attaching first end 16 of cord 12 to ring 14 by folding flat section 20 about ring 14 and overlapping flat section 20 with itself such that ring 14 is enclosed by a fold 22 at first end 16. The overlapped flat section 20 is heat welded, melt bonded, tied or sewn together along a first bonded region 24 so that ring 14 is fixed to first end 16 of cord 12 within fold 22. Other types of cord and other means for attaching first end 16 of cord 12 to ring 14 may alternatively be used with the invention.

The invention includes a first loop 26 which is generally adjacent first end 16 of cord 12. First loop 26 passes through ring 14, and is formed by passing free end 18 of cord 12 through ring 14, as can be seen most clearly in FIG. 2A. First loop 26 partially overlaps fold 22 and first end 16 of cord 12 at a first overlap region 28. Preferably, flat section 20 of cord 12 is of sufficient length such that first loop 24 generally comprises overlapped flat section 20 from which the internal reinforcing strands have been removed.

A second loop 30 is also included with the invention adjacent to first loop 26, with second loop 30 being formed by passing free end 18 of cord 12 through ring 14 after first loop 26 has been formed. Preferably, second loop 30 comprises a portion of cord 12 which includes the internal reinforcing strands, and thus the portion of cord 12 comprising second loop 30 is generally thicker in cross-section than in first loop 26. Second loop 30 partially overlaps first loop 26 along a second overlap region 32. A channel or passage 34 is defined by first and second loops 26, 30, with channel 34 passing through generally the center of first and second loops 26, 30.

The invention additionally comprises a third loop 36 (FIG. 1) which is formed by passing free end 18 of cord through channel 34 and first and second loops 26, 30, so that a generally straight section 38 of cord 12 is within channel 34 through first and second loops 26, 30. First and second loops 26, 30 are tightened so that first loop 26 frictionally engages fixed end 16 and fold 22 along overlap region 28, and second loop 30 frictionally engages first loop 26 along overlap region 30. Both first and second loops 26, 30 will also frictionally engage straight section 38 of cord 12 within channel 34 when the apparatus 10 is tensioned, as described further below. An elongated section 40 of cord 12 is preferably included between cord section 38 adjacent first and second loops 26, 30 and free end 18 of cord 12 after first and second loops 26, 28 have been tightened. Third loop 36 preferably remains relatively loose or untightened so that a user may manually grasp third loop 36 or otherwise use third loop 36 to attach the extensible tether apparatus 10 to an object.

The extensible tether apparatus 10 is used by sliding straight section 38 of cord 12 within channel 34 to vary the length of elongated section 40 (FIG. 1) of cord 12. As section 40 of cord is increased in length, the size or circumference of third loop 36 is correspondingly decreased. Decreasing the length of cord section 40 correspondingly increases the size of third loop 36. The length of elongated section 40 and size of third loop 36 can only be adjusted when little or no tension is present in the apparatus 10. Thus, extension or retraction of cord section 40 is carried out when cord 12 is in a generally relaxed or un-tensioned state. When tension is applied to extensible tether apparatus 10 at free end 18 and/or third loop 36, first and second loops 26, 30 are forced against straight section 38 of cord 12 and frictionally engage straight section 38 and prevent straight section 38 from sliding or slipping within channel 34 through first and second loops 26, 30, thus preventing the length of cord section 40 from changing.

The extensible tether apparatus 10 is particularly well suited for use as a leash or tether for dogs or other animals. Prior to attaching the extensible tether apparatus to an animal, the user of the apparatus 10 adjusts the length of elongated section 40 by sliding straight section 38 through channel 34 while the apparatus 10 is not tensioned, as described above, to set or control the range of motion or freedom of the animal. At the same time, the size of third loop 36 is adjusted to the desired size. When the extensible tether apparatus 10 been thus adjusted, the second or free end 18 of cord 12 is attached to the animal, preferably by attachment to a collar or harness worn by the animal. A clip (not shown) or other fastener may be included on free end 18 to facilitate attachment of free end to the animal collar or harness, or free end 18 may be knotted to the collar or harness. The user can manually hold third loop 36, or can slip third loop 36 about the user's waist, or can attach third loop to a post or other object. When the animal attached to free end 18 reaches the maximum distance or range allowed by the extensible tether apparatus 10, tension is applied to cord 12 from free end 18 and third loop 36, forcing first and second loops 26, 30 to frictionally engage straight section 38 and prevent extension of cord section 40 when the animal is pulling on apparatus 10 from free end 18. If the user wishes to extend or retract cord section 40 to alter the animals range, tension is removed from cord 12 by temporarily restraining the animal or detaching the animal from free end 18, so that the apparatus 10 is not tensioned and first and second loops 26, 30 are not forced against straight section 38 of cord, and so that straight section 38 can slide through channel 34 to allow adjustment to the length of cord section 40.

Figure 3:
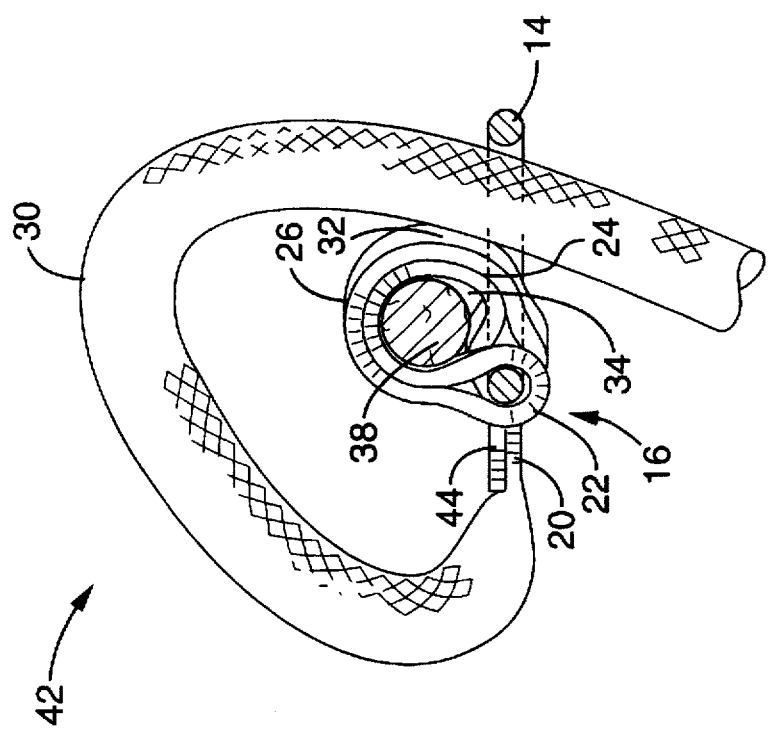
FIG. 3 is a side elevation view of an alternative embodiment of the invention showing the second loop loosened and showing the ring and a portion of the cord in cross-section.

Referring now to FIG. 3 and FIG. 4A and 4B, an alternative embodiment extensible tether apparatus 42 is generally shown, wherein like reference numerals denote like pans. Flat section 20 adjacent first end 16 of cord 12 is folded about ring at fold 22 and attached thereto by a first bonded region 24 where flat section 20 overlaps itself, as described above. Means for preventing the untying or loosening of first loop 26 are included with the extensible tether apparatus 42 in the form of a second bonded region 44 within the overlapped flat section 20. An opening 46 is formed between adjacent portions of flat section 20 between first and second bonded regions 24, 44. Cord 12 is attached to ring 14 at opening 46, with ring 14 passing through opening 46. Thus, cord 12 is affixed to ring 14 both at first end 16 by fold 22 and first bonded region 24, and at opening 46 by second bonded region 44. Second bonded region 44 and opening 46 are positioned such that straight section 38 of cord may still be slidably moved through channel 34.

First loop 26 is formed and tightened or adjusted to desired size prior to passing ring 14 through opening 46 and forming second bonded region 44. Thus, second bonded region 44 prevents first loop 26 from being untied or loosened from ring 14. Other means for affixing cord 12 to ring 14 after first loop 26 has been formed may also be utilized. When a clip or knot (not shown) is included at free end 18 of cord 12, the clip or knot will prevent free end 18 of cord 12 from being withdrawn through channel 34 and first loop 26 due to the presence of second bonded region 44, thus providing means for preventing second and third loops 30, 36 from being untied. The extensible tether apparatus 42 thus cannot be rendered inoperative by untying. The prevention of untying of the first, second and third loops 26, 30, 36 is a particularly desirable feature where children use the invention as an animal tether, since children frequently are motivated by curiosity to untie or disassemble knots.

The extensible tether apparatus 42 is otherwise utilized in the same manner described above for the first embodiment extensible tether apparatus 10, by sliding straight section 38 of cord 12 within channel 34 to vary the length of elongated section 40 of cord 12 and vary the size or circumference of third loop 36.

Referring now to FIG. 5, as well as FIG. 1 through FIG. 4, the method of making and using the invention is generally shown.

At step 100, first end 16 of cord is affixed or attached to ring. Preferably, this step is carried out by forming a flattened section 20 on cord 12 adjacent first end 16 by removing inner reinforcing strands from the outer sheath of cord 12, as related above. Flat section 20 is overlapped against itself and heat welded, melt bonded, tied or sewn together along a bonded region 24 so that ring 14 is fixed to first end 16 of cord 12 within fold 22.

At step 110, first loop 26 is formed by passing free end 18 of cord 12 through ring. As described above, first loop 26 partially overlaps fold 22 and first end 16 of cord 12 at a first overlap region 28. First loop 24 preferably comprises the overlapped flat section 20 of cord 12.

At step 120, first loop 26 is rendered so that it cannot be untied, preferably by forming second bonded region 44 along overlapped flat section 20 of cord 12. This step is preferably carried out by forming second bonded region 44 at overlapped flat section 20, with opening 46 is formed between adjacent portions of flat section 20 between first and second bonded regions 24, 44. Cord 12 is attached to ring 14 at opening 46, with ring 14 passing through opening 46, as described above. Step 120 is optional, and may be omitted if subsequent untying of the apparatus 10 is desired. The size or tightness of first loop 26 should be adjusted as discussed below prior to step 120 if step 120 is carried out.

At step 130, second loop 30 is formed by passing free end 18 of cord through ring 14 after first loop 26 has been formed. Second loop 30 preferably comprises a portion of cord 12 which includes the internal reinforcing strands so that the portion of cord 12 comprising second loop 30 is generally thicker in cross-section than the overlapped flat section 20 in first loop 26. Second loop 30 partially overlaps first loop 26 along a second overlap region 32, as described above, and a channel or passage 34 is defined by first and second loops 26, 30.

At step 140, third loop 36 is formed by passing free end 18 of cord through channel 34 and first and second loops 26, 30 so that a straight section 38 of cord 12 is located within channel 34 through first and second loops 26, 30, and an elongated section 40 of cord 12 is adjacent free end 18 of cord 12.

At step 150, first and second loops 26, 30 are tightened or positioned so that first loop 26 frictionally engages fixed end 16 and fold 22 along overlap region 28, and second loop 30 frictionally engages first loop 26 along overlap region 30. Note that first loop 24 should be tightened or adjusted prior to step 120 if step 120 is carried out.

At step 160, the length of straight section 40 and size of third loop 36 are adjusted as desired by slidably extending or retracting straight section 38 of cord 12 through channel 34 in first and second loops 26, 30.

At step 170, free end 18 of cord 12 is attached to an animal such as a dog, preferably by a clip on free end 18 that detachably couples to a collar on the animal. In step 170, the user manually grasps third loop or places third loop about the user's waist to restrain the motion of the animal attached to free end 18. Tension from free end 18 and third loop 36 cause first and second loops 26, 30 to frictionally engage straight section 38 of cord 12 so that cord section 38 cannot slide or slip through channel 34 defined by first and second loops 26, 30, thereby retaining the adjusted length of cord section 40 obtained in step 160.

Please note that the above order of steps should not be considered limiting. Step 120, for example, may be carried out subsequent to the formation of second loop 30 in step 130 and/or the formation of third loop 30 in step 140.

Accordingly, it will be seen that this invention provides an extensible tether apparatus which allows quick, easy and reversible adjustment of the length of a rope, cord, line or tether without unwanted slipping from the adjusted length. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An extensible tether apparatus, comprising:
   (a) a ring;
   (b) a cord, said cord including a first end, said first end of said cord affixed to said ring;
   (c) said cord including a first loop, said first loop passing through said ring;
   (d) said cord including a second loop, said second loop passing through said ring, said second loop adjacent said first loop; and
   (e) said first and second loops defining a channel, said cord passing through said channel.

2. An extensible tether apparatus as recited in claim 1, further comprising a third loop in said cord, said third loop adjacent said second loop.

3. An extensible tether apparatus as recited in claim 1, further comprising means for preventing untying of said first loop.

4. An extensible tether apparatus as recited in claim 3, wherein said untying preventing means comprises a bonded region on said cord, said bonded region adjacent said first loop.

5. An extensible tether apparatus as recited in claim 1, wherein said first end of said cord includes a flat section.

6. An extensible tether apparatus as recited in claim 5, wherein said flat section of said cord is folded about said ring and bonded along a first bonded region.

7. An extensible tether apparatus as recited in claim 6, further comprising a second bonded region, said second bonded region adjacent to said first loop, said ring passing through an opening between said first and second bonded regions.

8. An extensible tether apparatus, comprising:
   (a) a substantially rigid ring;
   (b) a flexible cord, said cord including a first end and a second end, said first end of said flexible cord affixed to said ring;
   (c) said flexible cord including a first loop, said first loop passing through said ring;
   (d) said flexible cord including a second loop, said second loop passing through said ring, said second loop positioned adjacent said first loop;
   (e) said flexible cord including a third loop, said third loop positioned adjacent said second loop; and
   (f) said first and second loops defining a channel, said flexible cord passing through said channel.

9. An extensible tether apparatus as recited in claim 8, further comprising a first overlap region located adjacent said first loop and said first end of said flexible cord.

10. An extensible tether apparatus as recited in claim 9, further comprising a second overlap region located adjacent said first loop and said second loop.

11. An extensible tether apparatus as recited in claim 8, further comprising means for preventing untying of said first loop.

12. An extensible tether apparatus as recited in claim 11, wherein said untying preventing means comprises a bonded region on said flexible cord, said bonded region adjacent said first loop.

13. An extensible tether apparatus as recited in claim 8, wherein said first end of said flexible cord includes a flat section.

14. An extensible tether apparatus as recited in claim 13, wherein said flat section of said flexible cord is folded about said ring and bonded along a first bonded region.

15. An extensible tether apparatus as recited in claim 14, further comprising a second bonded region, said second bonded region adjacent to said first loop, said ring passing through an opening between said first and second bonded regions.

16. A method for adjusting the length of a tether, comprising the steps of:
   (a) providing a ring and a cord, said cord including first and second ends;
   (b) attaching said first end of said cord to said ring;
   (c) forming a first loop by passing said second end of said cord through said ring;
   (d) forming a second loop by passing said second end of said cord through said ring, said second loop positioned adjacent said first loop;
   (e) forming a third loop by passing said second end of said cord through said first and second loops; and
   (f) slidably moving said cord through said first and second loops.

17. A method for adjusting the length of a tether as recited in claim 16, further comprising the step of tightening said first and second loops.

18. A method for adjusting the length of a tether as recited in claim 16, further comprising the step of preventing said first loop from becoming untied.

19. A method for adjusting the length of a tether as recited in claim 18, wherein said preventing step is carried out by bonding said cord to said ring by a bonded region, said bonded region adjacent to said first loop.

20. A method for adjusting the length of a tether as recited in claim 16, further comprising the step of attaching said second end of said cord to an animal.

* * * * *